United States Patent [19]

Witte

[11] Patent Number: 4,594,039
[45] Date of Patent: Jun. 10, 1986

[54] FASTENER

[75] Inventor: Erwin C. Witte, Placentia, Calif.

[73] Assignee: Microdot Inc., Darien, Conn.

[21] Appl. No.: 262,692

[22] Filed: May 11, 1981

[51] Int. Cl.⁴ .............................................. F16B 39/30
[52] U.S. Cl. ................................................... 411/311
[58] Field of Search ........................................ 411/311

[56] References Cited

U.S. PATENT DOCUMENTS

| 1,075,310 | 10/1913 | Ulrich | 411/309 |
| 1,416,087 | 4/1922 | Woodward | 411/307 |
| 1,798,604 | 3/1931 | Hoke | 411/22 |
| 2,788,046 | 12/1952 | Rosan | 411/311 |
| 2,870,668 | 1/1959 | Flahut | 411/436 |
| 4,076,064 | 2/1978 | Holmes | 411/285 |
| 4,150,702 | 4/1979 | Holmes | 411/310 |
| 4,171,012 | 10/1979 | Holmes | 411/285 |
| 4,266,590 | 5/1981 | McKewan | 403/307 |

FOREIGN PATENT DOCUMENTS 957858 4/1964 United Kingdom ................ 411/411

Primary Examiner—Andrew V. Kundrat
Attorney, Agent, or Firm—Lyman R. Lyon

[57] ABSTRACT

A fastener comprising a nut with V-threads modified to have a wedge ramp between adjacent flanks at the root thereof and characterized by the uniform pitch of the nut thread being a predetermined amount greater than the uniform pitch of the bolt thread which, in combination with the wedge ramp, results in optimum stress distribution within the bolt as well as a prevailing torque and anti-vibration relationship between the nut and bolt.

1 Claim, 1 Drawing Figure

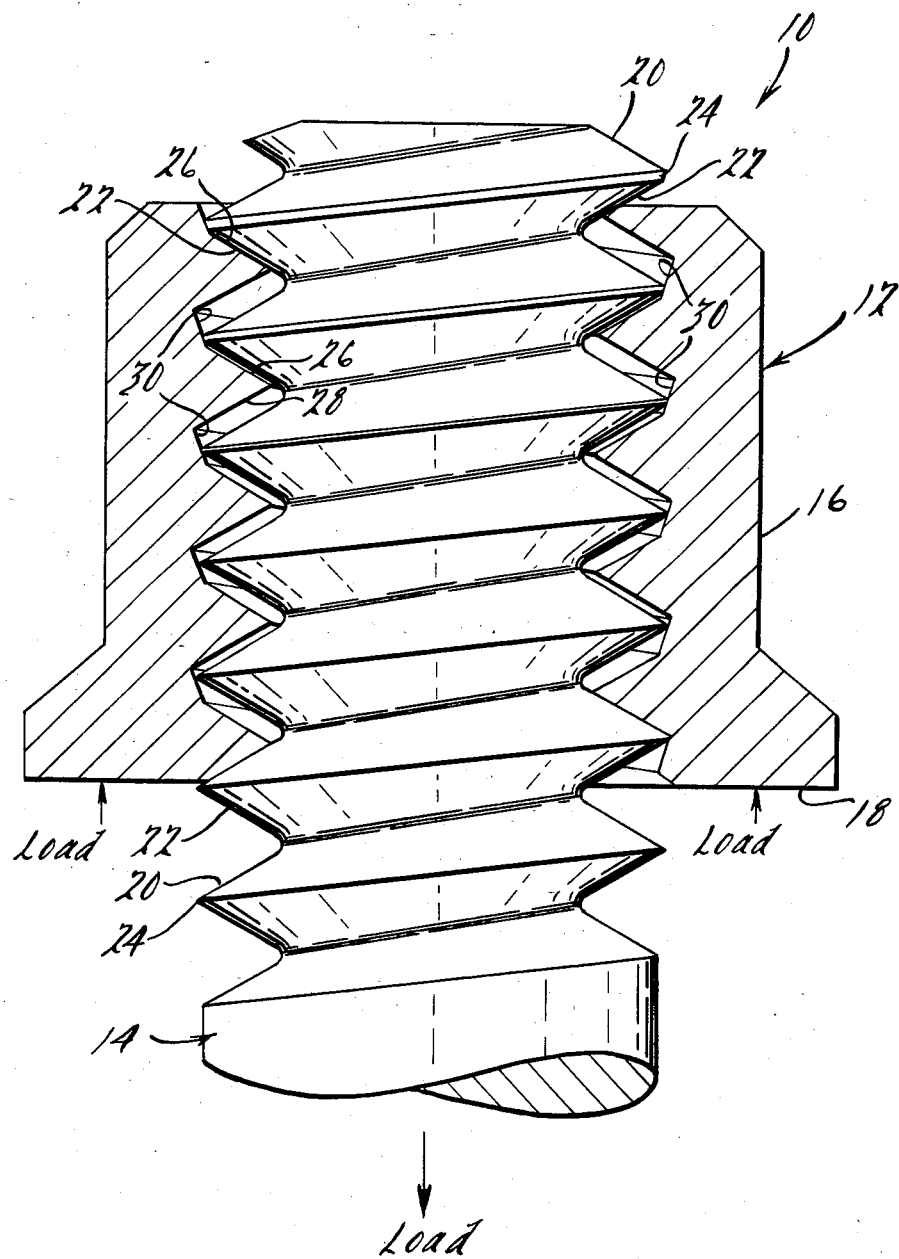

FASTENER

BACKGROUND OF THE INVENTION

This invention is an improvement on the nut disclosed in application Ser. No. 28,328, filed Apr. 9, 1979 and now U.S. Pat. No. 4,266,590 for "Prevailing Torque Nut" and assigned to the assignee of this invention.

BRIEF SUMMARY OF THE INVENTION

The invention relates to a nut having an internal thread with a wedge ramp at the root thereof of the type disclosed in U.S. Pat. No. 4,076,064 in combination with an increased pitch relative to the pitch of a complementary standard bolt.

DESCRIPTION OF THE DRAWINGS

The drawing is a side elevation, partly in section, of a fastener assembly utilizing the fastener of the instant invention.

DETAILED DESCRIPTION OF THE INVENTION

A fastener assembly 10, as shown in the drawing, comprises an improved nut 12 and standard bolt 14. The nut 12 has a conventional wrenching surface 16, with a flanged lower surface 18 adapted to bear against a workpiece, not shown. When the fastener assembly 10 is tightened by application of torque to the nut 12, the nut 12 will move downwardly relative to the bolt 14, as seen in the drawing, to exert a clamping force on a workpiece (not shown).

The bolt 14 is preferably of a standard design available on the open market. A preferred form of the bolt 14 is shown in which a helical, uniform, standard pitch V-thread has straight top and bottom flanks 20 and 22, respectively, with an included angle of 60° meeting at a crest 24 at the major diameter of the thread.

The nut 12 has a helical, uniform pitch, V-thread with straight top and bottom flanks 26 and 28, respectively, with an included angle of 60°. The flanks 26 and 28 are interconnected at their root by a wedge ramp 30 that extends at substantially a 30° angle to the central axis of the nut 12 converging toward the load bearing surface 18 of the nut 12. The diameter of the thread crest 24 on the bolt 14 and the tolerances thereof in relation to the nut thread is such that it is less than the maximum diameter of wedge ramp 30 and more than the minimum diameter thereof. Thus, the crest 24 of the thread on the bolt 14 will or will not engage the ramp 30 depending upon the relative axial position of the thread crest 24 on the bolt 14 and the ramp 30 of the nut 12.

In accordance with the present invention, the pitch of the internal thread of the nut 12 is greater than that of the external thread on the bolt 14. When the nut 12 is engaged on the bolt 14 it is initially free running for several convolutions due to axial clearance between the crest 24 of the bolt 14 and the ramp 30 of the nut 12 thereby to provide for easy assembly.

After a predetermined number of convolutions of the thread on the nut 12 are engaged with the thread of the bolt 14, the crest 24 of the uppermost thread convolution on the bolt 14 is drawn into an initial interference or prevailing torque fit with the wedge ramp 30 on the nut 12 due to engagement of the top flank 20 on the lowermost engaged thread convolution of the bolt 14 with the bottom flank 28 on the lowermost thread convolution of the nut 12.

Stated in another manner, the application of assembly torque to the nut 12 causes the crest 24 of the bolt 14 to ride down the ramp 30 on the nut 12, i.e., toward a lesser diameter, this being accommodated by coining or bending of the crest 24 of the thread convolutions at the upper end of the bolt thread. The resultant interference fit inhibits relative transverse movement between the internal and external threads of the nut 12 and bolt 14, respectively, and therefore resists loosening due to transverse vibration.

Moreover, when clamp load is applied to the bottom face 18 of the nut 12, the nut 12 is biased upwardly, as seen in the drawing, or stated in the converse, the crest 24 on the thread of the bolt 14 is biased downwardly relative to the ramp 30 of the nut 12 toward increased interference engagement therewith which serves to provide a second or load induced prevailing torque relationship between the nut 12 and bolt 14.

The aforesaid first self-induced prevailing torque relationship is to be distinguished from the relationship taught in said U.S. Pat. No. 4,076,064, which requires clamp load to bring about the prevailing torque phenomena. The pitch of the thread on the nut 12 is determined so that, with a desired number of thread convolutions of the nut 12 in engagement with the bolt 14, the bottom flank 22 of the uppermost thread convolution on the bolt 14 contacts or approaches contact with the top flank 26 of the thread on the nut 14, when the top flank 20 of the lowermost engaged convolution of the thread on the bolt 14 engages the lowermost bottom flank 28 on the thread on the nut 12, as shown in the drawing. This relationship produces maximum deformation of the crest 24 on the thread of the bolt 14 at the upper end thereof, thereby to distribute loading of the bolt 14 throughout the length thereof within the nut 12 and maximize loading at the upper end thereof, a highly desirable condition.

As indicated, the bolt 14 is preferably of standard thread form and of standard predetermined pitch. The axial length of the ramp 30 on the nut 12 is selected as determined by the class fit of the nut. The pitch of the nut thread and the number of internal threads on the nut 12 can then be determined from the formula $$P_n = P_b + L/N$$

where
  $P_n$ = the pitch of the thread on the nut 12
  $P_b$ = the pitch of the thread on the bolt 14
  L = the axial length of ramp 30
  N = the number of internal threads on the nut 12.

Modifications may be made in the specific application of the invention without departing from the spirit and scope of the invention. For example, an internal thread of increased pitch and having the wedge ramp 30 can be formed in a blind hole in a relatively large forging or casting for use with a standard stud bolt, in which case the forging or casting is the equivalent of the nut 12.

The term "standard" as used herein is intended to refer to accepted specifications for form of thread, pitch and tolerances as set forth in the American Standard thread handbook.

While the preferred embodiment of the invention is disclosed, it should be appreciated that the invention is susceptible to modification without departing from the scope of the claims.

What is claimed is:

1. A fastener assembly comprising a male fastener having a substantially uniform thread of substantially uniform pitch and including a top and bottom flank intersecting to define a crest, and a female fastener having a substantially uniform thread sized to receive the male thread but having a pitch greater than the pitch of said male thread, said female thread having a top and bottom flank with a wedge ramp at the root thereof, said wedge ramp being disposed at an acute angle to the central axis of said female fastener and converging in the direction of the surface of said female fastener that receives clamp loads, the number of said female thread convolutions, the pitch of said male fastener and the axial length of said ramp bearing a relationship to one another in accordance with the formula $$P_n = P_b + L/N$$

wherein
- $P_n$ = the pitch of the thread on the nut 12
- $P_b$ = the pitch of the thread on the bolt 14
- $L$ = the axial length of ramp 30
- $N$ = the number of internal threads on the nut 12.

* * * * *